United States Patent [19]
Woo et al.

[11] Patent Number: 5,532,297
[45] Date of Patent: Jul. 2, 1996

[54] DIVINYL BENZENE MODIFIED, AQUEOUS DISPERSED, ACRYLIC GRAFT COATINGS

[75] Inventors: James T. K. Woo, Medina; Gary C. Pompignano, North Royalton; Donston E. Awarski, Medina; Kevan A. Packard, North Olmsted, all of Ohio

[73] Assignee: The Glidden Company, Cleveland, Ohio

[21] Appl. No.: 451,147

[22] Filed: May 26, 1995

[51] Int. Cl.$^6$ ............................... C08K 3/20; C08L 63/02
[52] U.S. Cl. ........................ 523/408; 523/406; 523/407; 525/112
[58] Field of Search ..................... 523/408, 407, 523/406; 525/112

[56] References Cited

U.S. PATENT DOCUMENTS 4,212,781  7/1980  Evans et al. .................... 260/29.4
4,530,446  7/1985  Kanda et al. ....................... 523/418

*Primary Examiner*—Melvyn I. Marquis
*Assistant Examiner*—D. Aylward
*Attorney, Agent, or Firm*—Thomas M. Schmitz

[57] ABSTRACT

The invention pertains to aqueous dispersed, crosslinked microgel polymers useful as a polymeric binder in protective coatings. The microgel polymeric binder comprises epoxy-acrylic graft copolymer dispersed into water, emulsion copolymerized monoethylenically unsaturated monomer, and emulsion copolymerized divinyl benzene adapted to crosslink in the emulsion copolymerization step with the monoethylenic monomers to produce the crosslinked microgel polymer particles. The microgel polymer is particularly useful as binder for can coatings adapted to be heat cured to form a protective film.

8 Claims, No Drawings

DIVINYL BENZENE MODIFIED, AQUEOUS DISPERSED, ACRYLIC GRAFT COATINGS

This invention pertains to protective coatings containing low levels of volatile organic compounds (VOC), and more particularly to aqueous dispersed divinyl benzene modified, acrylic-graft polymeric binders particularly useful for coating interior substrates of beer and beverage containers (cans).

BACKGROUND OF THE INVENTION

Protective surface coatings are organic compositions applied to substrates to form continuous films which are cured or otherwise hardened to provide protection as well as a decorative appearance to the substrate. Protective surface coatings ordinarily comprise an organic polymeric binder, pigments, inert fillers and other additives, where the polymeric binder acts as a fluid vehicle for the pigments and imparts rheological properties to the fluid paint coating. Upon curing, the polymeric binder hardens and functions as a binder for the pigments and provides adhesion of the dried paint film to the substrate. The pigments may be organic or inorganic and functionally contribute to opacity and color in addition to durability and hardness, although some paint coatings contain little or no opacifying pigments and are described as clear coatings. The manufacture of paint coatings involves the preparation of a polymeric binder, mixing of component materials, grinding of pigments in the polymeric binder, and thinning to commercial standards.

Epoxy resins are particularly desirable for use in surface coating materials as a vehicle or polymeric binder to advantageously provide toughness, flexibility, adhesion, and chemical resistance to the applied coating film. Hence, water-dispersed coating compositions containing epoxy resins are highly desirable for can coating compositions. Coatings for soft drink and beer cans, for instance, are critical due to taste sensitivity and must not alter the taste of canned beverages. Taste problems can occur in a variety of ways such as by leaching of coating components into the beverage, or by absorption of flavor by the coating, or sometimes by chemical reaction, or by some combination thereof.

In commonly assigned U.S. Pat. No. 4,212,781, a process is disclosed for modifying epoxy resin by reacting the epoxy resin with addition polymerizable ethylenic monomer in the presence of at least 3% by weight of benzoyl peroxide (or the free radical initiating equivalent thereof) based on monomer at a suitable reaction temperature to produce a reaction mixture comprising an epoxy-acrylic copolymer mixture containing epoxy resin, graft epoxy-acrylic polymer, and associatively-formed ungrafted addition polymer. The in-situ polymerized monomers include acid functional monomers to provide acid functionality in the reaction mixture sufficiently high to effect stable dispersion of the resulting reaction product in a basic aqueous medium. Related commonly assigned U.S. Pat. No. 4,285,847 pertains to dispersing the preformed epoxy-acrylic copolymer mixture into water followed by in-situ emulsion copolymerization of ethylenic monomers in a second step polymerization.

Ordinarily the epoxy resin content of can coatings needs to be high to obtain good film integrity properties such as blush resistance and odor absorption. Beer and soft drink beverage can manufacturers require coatings which also need flexibility at lower bake temperatures and invariably require soft Tg ethylenic monomers such as ethyl acrylate, butyl acrylate and 2-ethyl hexyl acrylate. However, the soft monomers tend to cause a problem with carbon dioxide in beverages where excessive carbon dioxide losses from the beverage can cause a gushing effect when the beverage can is opened causing a messy eruption of beverage.

It now has been found that minor amounts of divinyl benzene included in the second step emulsion copolymerization of monoethylenically unsaturated monomers considerably improves the gush resistance and provides improved adhesion properties.

In accordance with this invention, epoxy resin is first grafted with ethylenic monomers (including carboxyl monomers) copolymerized in the presence of the epoxy resin and in the absence of water. A preformed epoxy-graft-acrylic resin mixture is preferably formed as proposed in commonly assigned U.S. Pat. No. 4,212,781. The preformed epoxy-graft-acrylic resin mixture is then dispersed into water with assistance of amines or other basic materials to produce an aqueous dispersion of the preformed epoxy-graft-acrylic. In accordance with this invention, second stage mono-ethylenically unsaturated monomers containing minor amounts of divinyl benzene are copolymerized with the aqueous dispersed preformed acrylic-graft-epoxy to produce moderately crosslinked emulsion microgel particles. The divinyl benzene crosslinking improves film properties and particularly eliminates the carbon dioxide gassing in carbon dioxide type beverages. These and other advantages of this invention will become more apparent by referring to the detailed description of the invention and illustrative examples.

SUMMARY OF THE INVENTION

Briefly, the invention pertains to a graft, epoxy-acrylic copolymer produced in a first stage polymerization by copolymerizing ethylenically unsaturated monomers in the presence of epoxy resin in the absence of water. The acrylic graft epoxy copolymer is then dispersed into water followed by a second stage in-situ emulsion copolymerization of mono-ethylenically unsaturated monomers along with minor amounts of divinyl Benzene monomer in the presence of the water dispersed acrylic graft epoxy to produce a crosslinked microgel emulsion polymer. The microgel polymeric composition comprises by weight between 10% and 88% epoxy, between 10% and 70% non-aqueous copolymerized grafting monomers, between 1% and 79% emulsion copolymerized ethylenic monomers, and between 0.1% and 10% emulsion copolymerized divinyl benzene.

DETAILED DESCRIPTION OF THE INVENTION

The invention is based on a preformed acrylic grafted epoxy copolymer subsequently dispersed into water followed by emulsion polymerization of mono-ethylenic monomers and minor amounts of divinyl benzene to produce emulsion microgel crosslinked polymer particles.

Referring first to the preformed acrylic-grafted-epoxy prepolymer produced in the absence of water, the prepolymer is produced in a first stage polymerization by reacting the epoxy resin by carbon grafting with addition polymerizable ethylenically unsaturated monomer. The preferred graft prepolymer is a carbon graft epoxy-acrylic where the ethylenic monomers are copolymerized in the presence of at least 3% by weight peroxide based on the weight of monomer copolymerized. The epoxy resin can be either aliphatic or aromatic, although the aromatic epoxy resins are preferred. The most preferred epoxy resins are polyglycidyl ethers of bisphenol-A, especially those having 1,2-epoxy equivalency of from about 1.3 to about 2. The molecular weight should be from about 350 to about 20,000 and preferably, for sanitary coating compositions, from about 4,000 to about 10,000. Mixtures of monoepoxides and diepoxides are desirable. Another procedural variation is the introduction of the aromatic polyether which is devoid of oxirane functionality by reacting epoxy groups with benzoic acid, phenol or similar monoreactive epoxide blocking agent. In preferred practice, the epoxy resin is a mixture of aromatic polyether having a single oxirane group and aromatic polyether having two oxirane groups. This mixture of epoxy functionality maximizes compatibility, although aromatic polyether devoid of oxirane functionality can be added later, if desired, and the mixture can be heated and agitated to enhance the intimacy of the association between the various components.

Epoxy resins are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4,4' dihydroxy biphenyl, with the most preferred being bisphenol-A. Halohydrins include epichlorohydrin, dichlorohydrin, and 1,2-dichloro 3-hydroxypropane with the most preferred being epichlorohydrin. Preferred epoxy resins comprise the coreaction product of excess molar equivalents of epichlorohydrin and bisphenol-A to produce predominantly an epoxy group terminated linear molecular chain of repeating units of diglycidyl ether of bisphenol-A containing between 2 and 30 repeating copolymerized units of diglycidyl ether of bisphenol-A. In practice, an excess molar equivalent of epichlorohydrin are reacted with bisphenol-A to produce epoxy resins where up to two moles of epichlorohydrin coreact with one mole of bisphenol-A, although less than complete reaction can produce difunctional epoxy resin along with monoepoxide chains terminated at the other end with a bisphenol-A unit. The most preferred linear epoxy resins are polyglycidyl ethers of bisphenol-A having terminating 1,2-epoxide groups and an epoxy equivalent weight between 2,000 and 10,000, and a number average molecular weight from about 4,000 to 20,000 as measured by gel permeation chromatography (GPC). Commercially available lower molecular weight epoxy resins include Dow Chemical epoxy resins identified by trade number and average molecular weights as follows: DER 333 (380); DER 661 (1100); while Shell Chemical epoxy resins are EPON 828 (380); EPON 836 (625); EPON 1001 (1100). EPON 1009F (7000); and Ciba-Geigy linear epoxy resins GT-7013 (1400);GT-7014 (1500); and GT 7074 (2000). Although not as common, trifunctional epoxy resins are useful where the branched chains as well as the backbone chain are each terminated with a terminal epoxide group to provide greater than two epoxide functionality. Trifunctional epoxy resins can be produced by coreacting epichlorohydrin with polynuclear polyhydroxy phenols, trifunctional phenols, or aliphatic trifunctional alcohols. Molecular weights of polymers are weight average molecular weights and ordinarily can be measured by gel permeation chromatography (GPC) as set forth in ASTM D 3016-72 and ASTM D 3593-80.

The acrylic portion of the carbon-graft epoxy-acrylic copolymer comprises polymerized ethylenically unsaturated monomers which include carboxyl functional monomers such as acrylic acid and lower alkyl substituted acrylic acids such as methacrylic acid to provide carboxyl functionality means for dispersing the epoxy-acrylic copolymer mixture into water. The preferred acrylic acid is methacrylic acid. The balance of the monomers preferably are functionally nonreactive under the contemplated conditions of polymerization, although small amounts of other reactive functional monomers may be used such as hydroxy monomers illustrated by 2-hydroxy ethyl methacrylate, amide monomers illustrated by acrylamide, or N-methylol monomers illustrated by N-methylol acrylamide. The remaining monomers are non-functional but copolymerizable ethylenic monomers illustrated by acrylate and methacrylate esters, such as ethyl acrylate, methyl methacrylate or isobutyl methacrylate, styrene, or vinyl toluene, vinyl acetate, vinyl chloride, vinylidene chloride, acrylonitrile, and generally alkyl esters of an acrylic acid, generally the lower alkyl esters, that is, those esters in which the esterifying group contains from 1 to 4 carbon atoms, and particularly ethyl acrylate. Other useful monomers in this class include other $C_{1-15}$ alkyl acrylate esters and methacrylate esters such as, for example, propyl acrylate, isopropyl acrylate, butyl acrylate, isobutyl acrylate, tertiary butyl acrylate, pentyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate. Other useful monomers are those readily commercial available monomers having vinyl unsaturation and include styrenic monomers such as styrene and vinyl toluene.

The preferred acrylic-graft-epoxy prepolymer is prepared by in-situ polymerization of the ethylenic monomers with epoxy resin. The epoxy resin can be heated in a reactor wherein the polymerizable monomer can be added slowly over a period of at least two or three hours along with a solvent if desired and a free radical initiator. Although the reaction may be conducted in the absence of solvent, a solvent system is preferred for the in-situ polymerization of monomers in the presence of epoxy resin. A preferred solvent system comprises two miscible solvents, one of which dissolves the epoxy resin and the other of which dissolves the monomers. The particular solvents satisfactory for the epoxy resin are solvents such xylene, benzene, ethyl benzene, toluene, and the alkoxy alkanols. Suitable solvents for the monomer include alcohols such as methanol, ethanol, propanol, butanol, and the like, are suitable, with butanol being preferred. Ethylene glycol monobutyl ether, ethylene glycol monobutyl ether acetate, and the like, hexane, mineral spirits, and the like, are also suitable. For subsequent dispersion into water, the solvents selected should be water-soluble materials, as are acetone, butanol, ethanol, propanol, ethylene glycol monoethyl ether, and the like. Ordinarily the amount of solvent may be in the range from about 5% to 30% by weight of the sum of the other components.

In practice, the epoxy resin and the mixture of polymerizable monomers are reacted together in the presence of a free radical initiator, preferably of the peroxide type, and benzoyl peroxide is most preferred. Typical and useful free radical initiators include cumene hydroperoxide, benzoyl peroxide, t-butyl perbenzoate, t-butyl peroxide, lauryl peroxide, methyl ethyl ketone peroxide, chlorobenzoyl peroxide, and the like. Benzoyl peroxide is preferred as the free radical initiator for use in the practice of the present invention. The amount of free radical catalyst can be expressed in terms of percentage by weight of benzoyl peroxide based on the total weight of the polymerizable monomer, or equivalent, at the temperature of use. The amount of peroxide catalyst should be at least about 3%, and preferably between 5% and 10% weight of benzoyl peroxide or equivalent peroxide based on monomer weight copolymerized. The reaction temperature preferably is maintained in the range from about 80° C. to about 130° C., although the temperature may be adjusted within a workable range to accommodate the reactivity of the mixture. Thus, operating temperatures in the range from abut 30° C. to about 200° C. are feasible, depending upon the end results and operating conditions selected. After the monomers are added, the reaction mixture is normally held for up to three hours at reaction temperatures to complete the monomer conversions. The in-situ polymerization of the monomers produces an in-situ formed carboxyl functional polymer containing at least about 20% of polymerized monoethylenically unsaturated carboxylic acid monomer based on the total weight of monomers. The acrylic-grafted-epoxy copolymer prepolymer produced in first stage polymerization comprises by weight between about 50% and 90% epoxy resin with the balance being copolymerized ethylenic monomers.

The epoxy-acrylic graft copolymer also can be an epoxy-acrylic ester graft copolymer produced from previously described epoxy resin and copolymerized monomers including carboxyl monomers wherein the epoxy-acrylic ester graft copolymer comprises acidic or carboxylic copolymer esterified with epoxy resin. A preferred epoxy-acrylic ester graft copolymer can be produced by esterifying a solvent-soluble carboxy functional polymer with an epoxy resin wherein the esterification reaction is carried out preferably in an organic solvent and in the presence of sufficiently high amounts of amine catalyst to produce a nongelled epoxy ester graft copolymer. The esterification reaction is carried out in the presence of amine catalyst in sufficient amounts greater than catalytic amounts of 0.3% to avoid gellation and preferably in the presence of greater than 2% amine esterification catalyst based on the weight of reactants subjected to esterification to produce an epoxy-acrylic ester graft copolymer. The preformed acrylic polymer preferably comprises copolymerized ethylenically unsaturated monomers including at least about 20% by weight of copolymerized monoethylenically unsaturated carboxylic acid monomer based on the total weight of copolymer to produce a carboxyl functional prepolymer. The epoxy resin portion comprises at least about 40% of the epoxy-acrylic ester polymer and provides an oxirane functionality in a stoichiometric deficiency with respect to carboxyl functionality in the carboxyl preformed polymer in a ratio of about 1:2 to 1:20 whereby the excess carboxyl functionality in the epoxy-acrylic ester provides a means for dispersing the polymer into water by reacting with a base to render the reaction product self-emulsifiable into water, as further described in detail in U.S. Pat. No. 4,480,058. Still a further variation of the epoxy-acrylic graft copolymer can comprise forming a preformed carboxylic polymer of polymerized ethylenic monomers including carboxyl monomers in the presence of melamine resin followed by reacting the preformed carboxylic polymer with epoxy resin in the presence of high amounts of amine as suggested in U.S. Pat. No. 4,289,811 to form an epoxyacrylic ester graft copolymer.

The acrylic-graft-epoxy prepolymer is dispersed into water, preferably into deionized water, using a fugitive base (under curing conditions for the coating) such as primary, secondary, and tertiary alkyl, alkanol, and aromatic amines and alkanolalkyl mixed amines; e.g. mono-ethanol amine, dimethyl ethanol amine, diethanol amine, triethyl amine, dimethyl aniline, ammonium hydroxide or the like. Ordinarily this is done by adding an amine with some water and mixing vigorously while (optionally) warming, then diluting the dispersion with more deionized water as is desired. Preferably the heated prepolymer is dispersed into water containing the fugitive base material. The amount of water in the aqueous dispersion of prepolymer depends on the desired weight solids for second stage emulsion polymerization of monomers in accordance with this invention. A desirable range for the aqueous dispersion of prepolymer is between about 10% and 50% acrylic-graft-epoxy prepolymer with balance being water.

In accordance with this invention, ethylenically unsaturated monomers along with divinyl benzene are emulsion copolymerized in the presence of the aqueous dispersion of preformed acrylic-graft-epoxy copolymer. Useful ethylenically unsaturated monomers are mono-unsaturated monomers containing carbon-to-carbon, ethylenic unsaturation and include vinyl monomers, acrylic monomers, allylic monomers, acrylamide monomers, and mono- and dicarboxylic unsaturated acids. Vinyl esters include vinyl acetate, vinyl propionate, vinyl buryrates, vinyl benzoates, vinyl isopropyl acetates and similar vinyl esters. Vinyl halides include vinyl chloride, vinyl fluoride, and vinylidene chloride. Vinyl aromatic hydrocarbons include styrene, methyl styrenes and similar lower alkyl styrenes, chlorostyrene, vinyl toluene, and vinyl naphthalene. Vinyl aliphatic hydrocarbon monomers include alpha olefins such as ethylene, propylene, isobutylene, and cyclohexene. Vinyl alkyl ethers include methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomer include, for example, acrylic and methacrylic acid, methyl acrylate and methacrylate, ethyl acrylate and methacrylate, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl and cresyl glycidyl ethers reacted with acrylic and methacrylic acids, hydroxyl alkyl acrylates and methacrylates such as hydroxyethyl and hydroxy propyl acrylates and methacrylates, as well as amino acrylates and methacrylates. Carboxlyic acid functional monomers can be included if desired. Carboxlyic acid monomer include acrylic and methacrylic acids. Acrylic acids include acrylic and methacrylic acid, ethacrylic acid, alpha-chloracrylic acids, alpha-cyanoacrylic acid, crotonic acid, beta-acryloxy propionic acid, and iraconic acid.

In accordance with this invention, a minor amount of divinyl benzene is copolymerized in the second stage aqueous polymerization step with the mono-ethylenically unsaturated monomers either simultaneously or by an end polymerization to produce emulsion polymerized, crosslinked polymer particles. The mono-ethylenic monomers and the divinyl benzene are emulsion copolymerized in the presence of the aqueous dispersed acrylic graft epoxy copolymer to produce controlled levels of crosslinking during the second stage emulsion polymerization. On a weight basis, between about 0.1% and 10% and preferably between 0.5% and 5% of the microgel polymer comprises copolymerized divinyl benzene. Useful mono-ethylenically unsaturated monomers include for instance vinyl, acrylic, allylic, and acrylamide monomers previously described. Particularly useful monomers are acrylate and acrylate and methacrylate esters, such as ethyl acrylate, methyl methacrylate or isobutyl methacrylate, styrene, or vinyl toluene, vinyl acetate, vinyl chloride, vinylidene chloride, acrylonitrile, alkyl esters of an acrylic acid, generally the lower alkyl esters in which the esterifying group contains from 1 to 4 carbon atoms, and particularly ethyl acrylate. Other useful monomers in this class include other alkyl acrylate esters and methacrylate esters such as, for example, propyl acrylate, isopropyl acrylate, butyl acrylate, isobutyl acrylate, tertiary butyl acrylate, pentyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate. Other useful monomers are those readily commercial available monomers having vinyl unsaturation and include styrenic monomers such as styrene, methyl styrene and similar lower alkyl styrene and vinyl toluene.

The second stage monomer emulsion polymerization can be initiated by free radical initiators, such as peroxides, persulfates, peresters, redox initiators, and azo initiators. Preferred initiators are peroxide types such as cumene hydroperoxide, benzoyl peroxide t-butyl perbenzoate, t-butyl peroxide, lauryl peroxide, methyl ethyl ketone peroxide, chlorobenzoyl peroxide, and the like. The amount of free radical catalyst is expressed in terms of percentage by weight based on the total weight of the emulsion polymerizable monomer copolymerized. The amount of initiator should be at least about 0.1% but less than 10%, and preferably between 1% and 2% weight of peroxide based on monomer weight. The reaction temperature preferably is maintained in the range from about 30° C. to about 100° C. After the monomers are added, the reaction mixture is normally held for up to three hours at the reaction temperature to completed the monomer conversions.

On a weight basis, the aqueous dispersed divinyl benzene crosslinked microgel polymer comprises between 10% and 88% epoxy resin, between 10% and 70% non-aqueous polymerized first stage ethylenic monomers, between 1% and 79% emulsion polymerized second stage mono-ethylenic monomers, and between 0.1% and 10% emulsion polymerized divinyl benzene. The polymeric composition is particularly useful as a film forming polymeric binder for use in coatings.

Although not required, suitable crosslinking agents can be added, if desired, such as aminoplast crosslinking agents. Aminoplasts are melamine or melamine derivatives such as methylol melmine or similar alkylated melamine formaldehyde resins. Aminoplasts further include benzoguanamine, acetoguanamine, as well as ureaformaldehyde. Commercially available aminoplasts which are water-soluble or water-dispersible for the instant purpose include Cymel 301, Cymel 303, Cymel 325, Cymel 370, and Cymel 373 (all being products of American Cyanamid, Stamford, Conn., said aminoplasts being melamine based, e.g., hexamethoxymethyl melamine for Cymel 303), and Beetle 80 (products of American Cyanamid which are methylated or butylated ureas). Other suitable aminoplast resins are of the type produced by reaction of aldehyde and formal guanamines.

The amount of water in the coating compositions containing the crosslinked microgel polymeric binder of this invention depends on the viscosity desired and the method of application. For spraying, preferably the coating composition contains between about 10% and 30% by weight polymeric solids relative to 70% to 90% water including other volatiles such as minor amounts of solvents. For applications other than spraying, the aqueous polymeric dispersions can contain between about 10% and 40% by weight water. Organic solvents can be utilized to facilitate spray, if desired, or other application methods and such solvents include n-butanol, 2-butoxy-ethanol-1, xylene, toluene, and preferably n-butanol is used in combination with 2-butoxy-ethanol-1. The coating composition of the present invention can be pigmented and/or opacified with known pigments and opacifiers. For many uses, including food use, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating is cured thermally at temperatures in the range from about 95° C. to about 235° C. or higher for time sufficient to effect complete curing of the applied film as well as volatilizing of any fugitive component.

For metal sheet substrates intended as beverage containers and particularly for carbonated beverages such as beer, the coating should be applied at a rate in the range from 0.5 to 15 milligrams of polymer coating per square inch of exposed metal surface. To attain the foregoing, the water-dispersible coating as applied can be as thick as 0.1 to 1 mil.

For a better understanding of the present invention, the following examples are provided. In this application, all parts are parts by weight, all percentages are weight percentages, and temperatures are degrees Centigrade, unless otherwise expressly noted.

EXAMPLE I (I). Preparation of Epoxy Acrylic Graft Copolymer

Into a 100 gallon reactor was charged 133.2 lbs. of DER331, 70.2 lbs. of bisphenol A, 42.3 lbs. of butyl cellosolve and 86.1 g. of ethyl triphenylphosphonium acetate solution (70% NV in $CH_3OH$). The reaction mixture was stirred and heated under nitrogen sparge and a vacuum of 25" was applied. Agitation was set at 136 RPM. In about an hour, the temperature rose to 288° F. and 7.3 lbs. of volatile was collected in the decanter. Then 3.9 lbs. of fresh butyl cellosolve was added back into the reactor. After ~ 5 minutes, the temperature exothermed to 350° F., cooling was applied while the temperature rose to 365° F. Temperature was stablized at 355° F., and after an hour, viscosity (ICI cone and plate) was 50 poise, and % oxirane value was titrated to be ~0.7. Then 260 rams of deionized water was then pumped into the reactor and the reaction mixture held at 355° F. for ½ hour. A solvent mixture of 8.1 lbs. of butyl cellosolve, 17.9 lbs. of hexyl cellosolve and 64.3 lbs. of n-butanol was then added to the sealed reactor and allowed to mix thoroughly. The addition took about ½ hour and the temperature decreased to 270° F. Cooling was continued and the temperature stablized at 241° F. A monomer mixture consisting of the following: 34.9 lbs. of glacial methacrylic acid, 25.3 lbs. of styrene, 217.6 g. of ethyl acrylate, 5.3 lbs. of benzoyl peroxide (78% in water) and 13 lbs. of hexyl cellosolve was slowly added to the epoxy resin solution. The addition took 2 hours and a line rinse of 7.6 lbs. of n-butanol was then added. The grafted resin mixture was held at 241° F. for 1 hour and cooling was then applied until the temperature was at 205° F. Then 23.7 lbs. of dimethyl ethanol amine was added over 10 minutes and the reaction mixture stirred for 15 minutes. The temperature increased to 209° F. Then 657.9 lbs. of deionized water was then added over about 1½ hours and the temperature went to 187° F. After all the water was added, the mixture was stirred for 30 minutes, then cooling began, and in 1¼ hour, the temperature was 102° F. The dispersion was filtered through a 50 micron Hytrex and stored. The nonvolatile (NV) of the dispersion was 24.5% and total yield was 1092 lbs.

In the following examples 2–10, the epoxy-graft copolymer in Example 1 was used as polymeric surfactant to carry out second stage emulsion polymerization of monomers.

EXAMPLE 2

Batch charged monomer, redox initiator, divinyl benzene (DVB) in 2nd and 3rd stage, methacrylic acid (MAA) in 3rd stage.

Into a 5 liter, 4 necked round bottomed flask was charged with 2080 g (grams) of the aqueous dispersion from Example I. The flask was fitted with an air driven agitator, nitrogen inlet, and water cooled condenser. The dispersion was heated to 40° C. with agitation and nitrogen blanket, and the following ingredients were added, 17.9 g. of n-butanol, 7.5 g. of butyl cellosolve, 1.2 g. of hexyl cellosolve, 620.6 g. of deionized water, 2.7 g. of ascorbic acid and 0.03 g. of $FeSO_4$. A monomer mixture of 70.1 g. of butyl acrylate, 67.1 g. of styrene and 3 g. of DVB (practical grade) were then added and held at 40° C. for 45 minutes before adding 2.8 g. of t-butyl perbenzoate. The polymerization mixture was held at 40° C. for 3 hours, and the free monomer content was % BA: 0.3, % styrene: 0.1. Another monomer mixture of 119.5 g. of styrene, 2.6 g. of DVB and 2.8 g. of MAA was then batch charged into the flask and held at 40° C. for 45 minutes. Then 2.5 g. of t-butyl-perbenzoate was added, and polymerization held at 40° C. for 3 hours. At the end of the hold, the free monomer was determined by GC to be % BA=0 and % styrene=0.1. The dispersion has the following: NV: 25.7%, Acid No. (AN): 55.9, Base No. (BN): 35.6 and % neutralization: 63.7%.

EXAMPLE 3

Batch charged monomer, LUP-11 peroxide initiator, DVB in 2nd and 3rd stage, MAA in 3rd stage.

Into a 5 liter, 4 necked round bottomed flask was charged 2082 g. of dispersion from Example I. Then 18 g. of n-butanol, 7.5 g. of butyl cellosolve, 1.2 g. of hexyl cellosolve and 621.2 g. of deionized water were added. Heating was applied with agitation and nitrogen sparge and when temperature reached 80° C., 54.6 g. of butyl acrylate, 52.3 g. of styrene and 2.3 g. of DVB were added and held at 80° C. for 45 minutes. Then 2.2 g. of Lupersol - 11 (t-butyl peroxy pivalate) was added, and the polymerization held at 80° C. for 3 hours. Then another monomer mixture of 150.1 g. of styrene, 3.3 g. of DVB and 2.8 g. of MAA was added and held at 80° C. for 45 minutes. Then 3.1 g. of Lupersol - 11 was added and the polymerization mixture was held for another 3 hours at 80° C. The free monomer was determined to be % BA=0, and % styrene=0.5. The % NV was 25.3, acid number was 52.4, BN = 37 and % neutralization was 70.6.

EXAMPLE 4

Continuous feed monomer, LUP. 11 initiator and DVB in second stage.

Into a 4 necked, 5 liter round bottom flask was charged 2082 g. of the acrylic grafted epoxy aqueous dispersion from Example I and heating was applied under agitation and nitrogen blanket. At 38° C., 18 g. of n-butanol, 7.5 g. of butyl cellosolve, 1.2 g. of hexyl cellosolve and 621.2 g. of deionized water were added, while heating continued. At 80° C., a monomer solution of 54.6 g. of butyl acrylate, 49 g. of styrene, 5.6 g. of DVB and 2.2 g. of Lupersol-11 was added over 2 hours. Reaction temperature was kept at 80° C. An hour after the monomer addition, the free monomer was % BA=0.6 and % styrene=0.3. A second monomer solution of 156.2 g. of styrene and 3.1 g. of Lupersol-11 was added over about 2 hours and polymerization held at 80° C. for 2 more hours. The free monomer is % BA: 0, % styrene: 0.2. The NV is 25.5, AN is 49.8, BN is 36.4 and % neutralization is 73.1%.

EXAMPLE 5

Continuous feed monomer, redox initiator, MAA in 3rd stage, DVB not used.

Into a 5 liter, 4 necked round bottomed flask was charged 2080 g. of the aqueous dispersion from Example I, and then heated under agitation and nitrogen blanket. At 40° C., 7.5 g. of butyl cellosolve, 1.2 g. of hexyl cellosolve, 17.9 g. of n-butanol, 620.6 g. of deionized water, 2.7 g. of ascorbic acid and 0.03 g. of $FeSO_4$ were added. The mixture was stirred for about 40 minutes, and a monomer mixture of 70.1 g. of butyl acrylate, 70.1 g. of styrene and 2.8 g. of t-butyl-perbenzoate was added in 2 hours. After the monomer addition, the polymerization mixture was held for 1 hour, at which time the free monomer contents were % BA=0.4 and % styrene=0.1. A second monomer solution of 122.1 g. of styrene, 2.8 g. of methacrylic acid and 2.5 g. of t-butyl perbenzoate was added in 2 hours and held for 1 hour at 40° C. At the end of the hold, the free monomer is % BA: 0, % styrene: 0.1, % NV is 25.7, AN is 55.5, BN is 36 and % neutralization is 65.

EXAMPLE 6

Continuous feed monomer, t-butylperoctoate initiator, DVB in 2nd and 3rd stage.

Into a 5 liter, 4 necked round bottomed flask was charged 2080 g. of the aqueous dispersion from Example I and was heated with agitation and nitrogen blanket to 90° C. Then 18 g. of n-butanol, 7.5 g. of butyl cellosolve, 1.2 g. of hexyl cellosolve and 621.2 g of dionized water were added. This was followed by addition over 2 hours of a monomer solution consisting of 54.6 g. of butyl acrylate, 52.3 g. of styrene and 2.3 g. of DVB and 2.2 g. of tert-butyl peroctoate. At the end of the monomer addition, the polymerization mixture was held at 90° C. for another hour and the free monomer was % BA=0.4 and % styrene=0.2. A second monomer mixture consisting of 152.9 g. of styrene, 3.3 g. of DVB and 3.1 g. of t-butyl peroctoate was added over 2 hours, and the polymerization mixture held at 90° C. for another 2 hours before heating was discontinued. The free monomer was % BA=0 and % styrene=0.1. The NV of the dispersion was 25.7%, AN is 49.4, BN is 36.1 and % neutralization is 73.2%.

EXAMPLE 7

Batched charged monomers, t-butyl peroctoate initiator, MAA in 2nd and 3rd stage.

Into a 5 liter, 4 necked round bottomed flask was charged 2082 g. of aqueous dispersion from Example I. The dispersion was heated with agitation and nitrogen blanket to 90° C. and then 1.2 g. of hexyl cellosolve, 7.5 g. of butyl cellosolve and 621.2 g. of deionized water were added to the dispersion. At 90° C., a monomer solution of 54.6 g. of butyl acrylate, 53.4 g. of styrene and 1.2 g. of methacrylic acid was batch charged and mixed for 45 minutes before 2.2 g. of t-butylperoctoate in 7.4 g. of n-butanol was added. The polymerization mixture was held for 3 hours, at which time the free monomer was % BA=0.3 and % styrene=0.1. A second monomer solution of 154.6 g. of styrene and 1.7 g. of methacrylic acid was added and held for 45 minutes before adding 3.1 g. of t-butylperoctoate in 10.6 g. of n-butanol. The polymerization mixture was held for another 3 hours at 90° C. before turning off the heat. The free monomer was % BA=0 and styrene: 0.1. The NV of the dispersion was 25.6%, AN is 52.4, BN is 36.4 and % neutralization is 69.4%.

EXAMPLE 8

Batch charged monomer, Lupersol-11 initiator DVB in 2nd stage, MAA in 2nd stage.

Into a 5 liter, 4 necked round bottomed flask was charged 2082 g. of aqueous dispersion from Example I. Heating was applied with agitation and nitrogen blanket. At 56° C., 18 g. of n-butanol, 7.5 g. of butyl cellosolve, 1.2 g. of hexyl cellosolve and 621.2 g. of deionized water were added. At 80° C., a monomer mixture of 70.2 g. of butyl acrylate, 61.7 g. of styrene, 5.6 g. of DVB, 2.8 g. of MAA was added and stirred for 45 minutes before adding 2.8 g. of Lupersol-11. The polymerization mixture was held at 80° C. for 3 hours before a second monomer of 125 g. of styrene was added, and 45 minutes later, an addition of 2.5 g. of Lupersol-11 was added. The polymerization mixture was held at 80° C. for 3 hours and heating was stopped. The free monomer was % BA=0 and % styrene=0.3. The % NV of the dispersion was determined to be 25.3, AN was 52.1, BN was 36.7 and % neutralization was 70.4%.

EXAMPLE 9

Continuous feed monomer, redox initiator, DVB in stage 3.

Into a 5 liter, 4 necked round bottomed flask was charged 2080 g. of aqueous dispersion from Example I. Heating was applied with agitation and nitrogen blanket. At 40° C., 17.9 g. of n-butanol, 7.5 g. of butyl cellosolve, 1.2 g. of hexyl cellosolve, 620.6 g. of deionized water, 2.7 g. of ascorbic acid and 0.03 g. of $FeSO_4$ were added. This is followed by addition over 2 hours of a monomer solution of 70.1 g. of butyl acrylate, 70.1 g. of styrene and 2.8 g. of t-butylperbenzoate. After the monomer addition, the polyermization mixture was held at 40° C. for another hour and free monomer content was % BA=0.4 and % styrene=0.1. A second monomer feed consisting of 119.3 g. of styrene, 5.6 g. of DVB and 2.5 g. of tert-butylperbenzoate was added in 2 hours. The polymerization mixture was held at 40° C. for another hour and the free monomer content was % BA=0 and % styrene=0.1. The NV of dispersion was 25.6%, AN was 53.1, BN was 35.8 and % neutralization was 67.4.

EXAMPLE 10

Epoxy phosphate synthesis.

Epoxy phosphate was produced by adding 816 gms. of epoxy resin (DER-333), 384 gms. of bisphenol-A, and 163 gms. of butyl cellosolve in a 5 L round bottom flask equipped with a stirrer, condenser, and thermometer and heated to 140° C. When the temperature was at 140° C., the heat was turned off and the exotherm raised the temperature to 155° C. After the peak exotherm, the heat was turned back on to keep the temperature at 175° C. for an additional 2 hours. Periodic tests for viscosity and percent oxirane were made. Oxirane value was about 0.87% and the viscosity was X-Y at 40% NV Gardner/Holt in butyl cellosolve. When these values were obtained, 163 grams of butyl cellosolve were added, and the batch was cooled to 125° C. Mixture of 14.2 gms. of polyphosphoric acid (FMC) and 50 gms. of butyl cellosolve was added over 45 minutes, 30 gms. of extra butyl cellosolve was added as line rinse. The batch was held at 120° C. for 1 hour. Then 23 gms. of DI water were added to the reaction mixture and the batch was held at 120° C. for an additional 2 hours. After the hold time, the heat was turned off and 203 gms. of butanol were added over 8 minutes, 1550 gms. of DI water and 17.4 gms. of dimethyl ethanolamine were heated in a letdown container to 60° C. The above resin was dropped slowly into water amine mixture to form a suitable emulsion. The resulting emulsion was adjusted to 25% NV by adding 1000 grams of DI water and stirring continued for 2 hours to insure an homogeneous mixture.

In accordance with this Procedure various epoxy phosphates were produced with the following molecular weight variation.

TABLE 1

| Molecular Weight | % Oxirane | % Acid | % NV | Emulsion |
| --- | --- | --- | --- | --- |
| 9410 | 0.34 | 0.35 | 30.3 | Good |
| 6150 | 0.52 | 0.39 | 34.4 | Good |
| 4000 | 0.80 | 0.92 | 34.9 | Good |
| 3080 | 1.04 | 0.92 | 32.8 | Good |
| 2500 | 1.26 | 2.30 | 23.0 | Good |
| 1400 | 2.28 | 4.20 | 22.4 | Good |

Dispersions from Example 2 to 10 were formulated with or without epoxy phosphate, 5% on solids, with 3% cymel 325, and then sprayed into 2 piece beer and beverage cans. Similar compositions are reported in Table 2 as Examples 11 to 18 inclusive. The cans were then necked and flanged and then filled with Classic Coke. The filled cans were stored in an upside down configuration in a 100° F. oven room for one month. The cans were then turned right side up and cooled to room temperature before opening the tab.

Gushing is determined by a gushing index:

(1) Very little fizzing.

(2) Much fizzing.

(3) Much fizzing, and the Coke comes over onto the top of the lid but does not over flow onto the side of cans.

(4) Coke overflows the lid and over the side of cans.

(5) Mild gushing, about one inch.

(6) Severe gushing, over one inch height.

Gushing data is summarized in Table 2. Samples without DVB gushed while samples with DVB did not gush.

TABLE 2

| Example | DVB | Epoxy Phosphate | Gushing Index |
| --- | --- | --- | --- |
| 2 | Stages 2,3 | W/O | 1 |
| 3 | Stages 2,3 | With | 1 |
| 4 | Stage 2 | With | 2 |
| 5 | None | With | 5 |
| 6 | Both | With | 2 |
| 7 | None | With | 4 |
| 8 | Stage 2 | W/O | 2 |
| 9 | Stage 3 | W/O | 2 |
| 10 | Both | W/O | 2 |
| 11 | Both | With | 1 |
| 12 | None | W/O | 3 |
| 13 | Stage 3 | With | 1 |
| 14 | Stages 2,3 | With | 1 |
| 15 | None | With | 6 |
| 16 | Stage 2 | W/O | 1 |

TABLE 2-continued

| Example | DVB | Epoxy Phosphate | Gushing Index |
|---|---|---|---|
| 17 | None | W/O | 5 |
| 18 | Stage 3 | With | 1 |

The foregoing detail description and illustrative examples set forth preferred compositions of the invention but are not intended to be limited except by the appended claims.

We claim:

1. A process for producing a protective coating composition containing an aqueous dispersed microgel polymeric binder for coating interior substrates of beer and beverage containers, the process for producing the polymeric binder comprising:

copolymerizing ethylenically unsaturated monomer in the presence of epoxy resin having a number average molecular weight between 350 and 20,000 in a non-aqueous polymerization process to produce an epoxy-acrylic graft copolymer;

dispersing the epoxy-acrylic graft copolymer into water to produce an aqueous dispersed epoxy-acrylic copolymer;

emulsion copolymerizing monoethylenically unsaturated monomer and divinyl benzene in the presence of the aqueous dispersed epoxy-acrylic graft copolymer to produce a stable, aqueous dispersed, film forming polymeric binder of crosslinked microgel polymer particles containing by weight between 10% and 88% epoxy resin, between 10% and 70% non-aqueous copolymerized ethylenic monomer, between 1% and 79% emulsion copolymerized monoethylenic benzene and between a 0.1% and 10% emulsion polymerized divinyl benzene.

2. The process of claim 1 where the divinyl benzene copolymerized in the emulsion copolymerization step is between 0.5% and 5% based on the weight of the microgel polymer particles produced.

3. The process of claim 1 where the epoxy-acrylic graft copolymer is an ester graft epoxy-acrylic copolymer.

4. The process of claim 1 where the epoxy-acrylic graft copolymer is a carbon graft epoxy-acrylic copolymer produced by the ethylenically unsaturated monomer copolymerized in the non-aqueous polymerization step in the presence of at least 3% peroxide initiator based on the weight of said monomer copolymerized in the nonaqueous polymerization step.

5. The process of claim 4 where the non-aqueous polymerized monomers are copolymerized in the presence of 5% to peroxide initiator based on the weight of said monomer copolymerized in the non-aqueous polymerization step.

6. A protective coating composition for coating interior substrates of beer and beverage containers, the coating composition containing a polymeric binder comprising by weight:

between 10% and 88% epoxy resin having a number average molecular weigh between 320 and 20,000;

between 10% and 70% non-aqueous polymerized ethylenically unsaturated monomer where non-aqueous polymerized ethylenically unsaturated monomer is grafted to epoxy resin;

between 1% and 79% emulsion polymerized monoethylenically unsaturated monomer;

between 0.1% and 10% emulsion polymerized divinyl benzene where the divinyl benzene crosslinks with the emulsion polymerized monoethylenically unsaturated monomer; and where the non-aqueous polymerized ethylenically unsaturated monomer is copolymerized in the presence of the epoxy resin to produce a grafted epoxy-acrylic copolymer, and the polymeric film forming binder is produced according to the process of claim 1.

7. The coating composition of claim 6 where the aqueous dispersed microgel polymer contains by weight between 0.5% and 5% copolymerized divinyl benzene.

8. The coating composition of claim 6 where the epoxy-acrylic graft copolymer is a carbon graft epoxy-acrylic copolymer.

* * * * *